(12) United States Patent
Onogi et al.

(10) Patent No.: US 8,904,905 B2
(45) Date of Patent: Dec. 9, 2014

(54) CRANK DETACHABLE HOLDER

(71) Applicant: Shimano Inc., Sakai, Osaka (JP)

(72) Inventors: Takumi Onogi, Osaka (JP); Yuta Mizutani, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/710,636

(22) Filed: Dec. 11, 2012

(65) Prior Publication Data

US 2014/0157948 A1 Jun. 12, 2014

(51) Int. Cl.
*B62M 3/00* (2006.01)
*B62M 3/16* (2006.01)
*B62J 99/00* (2009.01)

(52) U.S. Cl.
CPC .............. *B62M 3/16* (2013.01); *B62J 2099/002* (2013.01)
USPC ....................................................... 74/594.1

(58) Field of Classification Search
USPC ................. 74/594.1, 594.2; 280/259; 403/319
See application file for complete search history.

(56) References Cited

U.S. PATENT DOCUMENTS

| 573,055 | A | * | 12/1896 | Valentine | 74/594.1 |
| 4,728,218 | A | * | 3/1988 | Durham | 403/319 |
| 5,209,581 | A | * | 5/1993 | Nagano | 384/545 |
| 5,653,150 | A | * | 8/1997 | Gignoux | 74/594.1 |
| 5,860,329 | A | * | 1/1999 | Day | 74/594.1 |
| 6,895,834 | B1 | * | 5/2005 | Baatz | 74/594.3 |
| 7,061,228 | B2 | | 6/2006 | Ichida et al. | |
| 8,025,304 | B2 | * | 9/2011 | Smith | 280/259 |
| 2004/0113608 | A1 | * | 6/2004 | Ichida et al. | 324/174 |
| 2004/0200314 | A1 | * | 10/2004 | Hermansen et al. | 74/594.1 |

FOREIGN PATENT DOCUMENTS

| DE | 10 2010 011 390 A1 | 9/2011 | | |
| DE | 20 2013 101 731 U1 | 6/2013 | | |
| GB | 2002089 A | * | 2/1979 | .............. F16D 1/06 |
| WO | 2004/057274 A1 | 7/2004 | | |

* cited by examiner

*Primary Examiner* — Vicky Johnson
(74) *Attorney, Agent, or Firm* — Global IP Counselors (57) ABSTRACT

A crank detachable holder is provided with a crank arm attachment part and a holding part. The crank arm attachment part has a mounting opening dimensioned to receive a bolt for connecting the crank arm to a crank axle. The holding part connected to the crank arm attachment part. The crank detachable holder is preferably part of a bicycle crank arm assembly.

17 Claims, 7 Drawing Sheets

CRANK DETACHABLE HOLDER

BACKGROUND

1. Field of the Invention

This invention generally relates to bicycles. More specifically, the present invention relates to an apparatus for a crank detachable holder used in a rotation detecting apparatus that detects rotation of a bicycle crank.

2. Background Information

Recently, bicycles have been equipped with a cycling computer, which provides information such as speed, cadence, rider inputs, etc. Cycling computers can make bicycle riding more enjoyable to the rider (e.g. by displaying various information to the rider such as time, elapsed time, speed, distance, average speed, etc.). Conventionally, a rotation detecting apparatus is attached to the bicycle to a wheel or a crank arm for detecting the rotation of the wheel or the crank arm so that a cycle computer may use the detected rotations to calculate and display the bicycle speed or pedal cadence to the rider. A conventional rotation detecting apparatus typically comprises a magnet mounted to a rotating part and a magnetic sensor mounted to a fixed part such as the bicycle frame. The magnetic sensor may comprise a reed switch, a Hall-effect element, etc., and it usually is mounted in a position that faces the magnet at some time during rotation of the bicycle part. For example, when used to calculate bicycle speed, the magnet may be mounted to the spoke of a wheel, and the magnetic sensor may be mounted to the front fork. When used to calculate pedal cadence, the magnet may be mounted to the crank arm, and the magnetic sensor may be mounted to either the seat tube or the down tube of the bicycle frame.

One example of a conventional rotation detecting apparatus is disclosed in U.S. Pat. No. 7,061,228 B2. In this patent, a special fixing structure is used to attach a magnet to the crank arm of cadence sensor. Instead of using the special fixing structure, magnets were more simply attached to the crank arm by a rubber band or a band fastener.

SUMMARY

Generally, the present disclosure is directed to various features of apparatus for detecting rotation of a bicycle part. One feature presented in this disclosure is to provide a bicycle crank arm assembly in which a holding part is provided on a crank arm of the bicycle crank arm assembly. The holding part includes one of a magnetized member and an electrical member.

In view of the state of the known technology, in one embodiment, a crank detachable holder comprises a crank arm attachment part and a holding part. The crank arm attachment part has a mounting opening dimensioned to receive a bolt for connecting the crank arm to a crank axle. The holding part connected to the crank arm attachment part.

In the illustrated embodiment, a bicycle crank arm assembly is provided that basically comprises a crank arm and a crank detachable holder. The crank arm has a pedal attachment end and a crank axle attachment end. The crank axle attachment end defines a crank axle receiving opening. The crank detachable holder includes a crank arm attachment part and a holding part that is connected to the crank arm attachment part. The crank arm attachment part has a mounting opening dimensioned to receive a bolt to connect the crank arm to a crank axle and to attach the crank detachable holder to the crank arm.

Other objects, features, aspects and advantages of the disclosed crank detachable holder will become apparent to those skilled in the art from the following detailed description, which, taken in conjunction with the annexed drawings, discloses preferred embodiments of the crank detachable holder.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
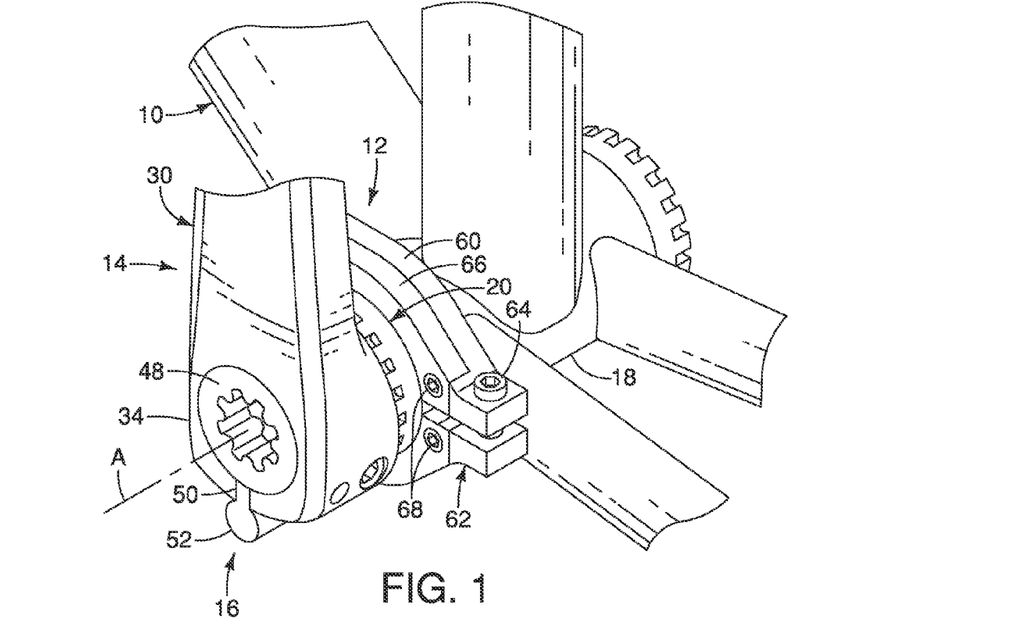
FIG. 1 is a perspective view of a portion of a bicycle that is equipped with a cadence sensor unit and a bicycle crank arm assembly having a crank detachable holder in accordance with a first embodiment.

Referring initially to FIG. 1, a portion of a bicycle 10 is illustrated that is equipped with a cadence sensor unit 12 and a bicycle crank arm assembly 14 including a crank detachable holder 16 in accordance with a first embodiment. Basically, the cadence sensor unit 12 detects rotation of the bicycle crank arm assembly 14 and outputs a signal indicative of the number of rotations of the bicycle crank arm assembly 14 per unit of time about a crank rotation axis A.

Figure 2:
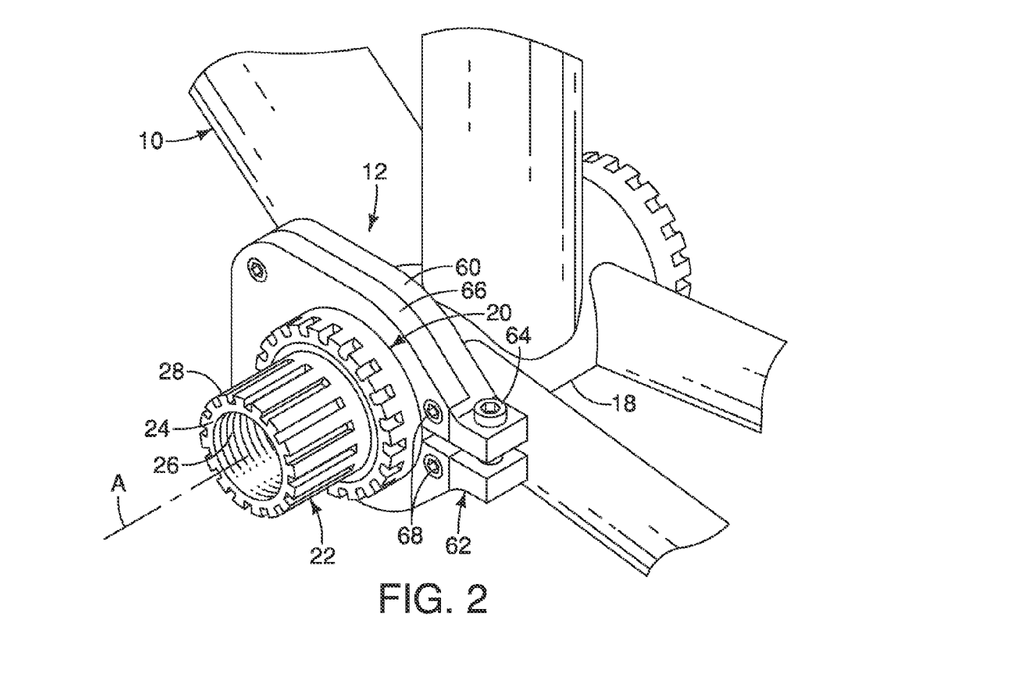
FIG. 2 is a perspective view of the portion of a bicycle illustrated in FIG. 1, but with the bicycle crank arm assembly removed.

As seen in FIG. 2, the cadence sensor unit 12 is attached to a hanger tube 18 (i.e., a part of the bicycle frame) of the bicycle 10 by a bottom bracket bearing assembly 20. The bottom bracket bearing assembly 20 rotatably supports a crank axle 22 in the hanger tube 18. Of course, it will be apparent to those skilled in the art from this disclosure that the cadence sensor unit 12 can be configured to be mounted to another part (e.g., a seat tube) of the bicycle 10 that is located adjacent the bicycle crank arm assembly 14.

Figure 3:
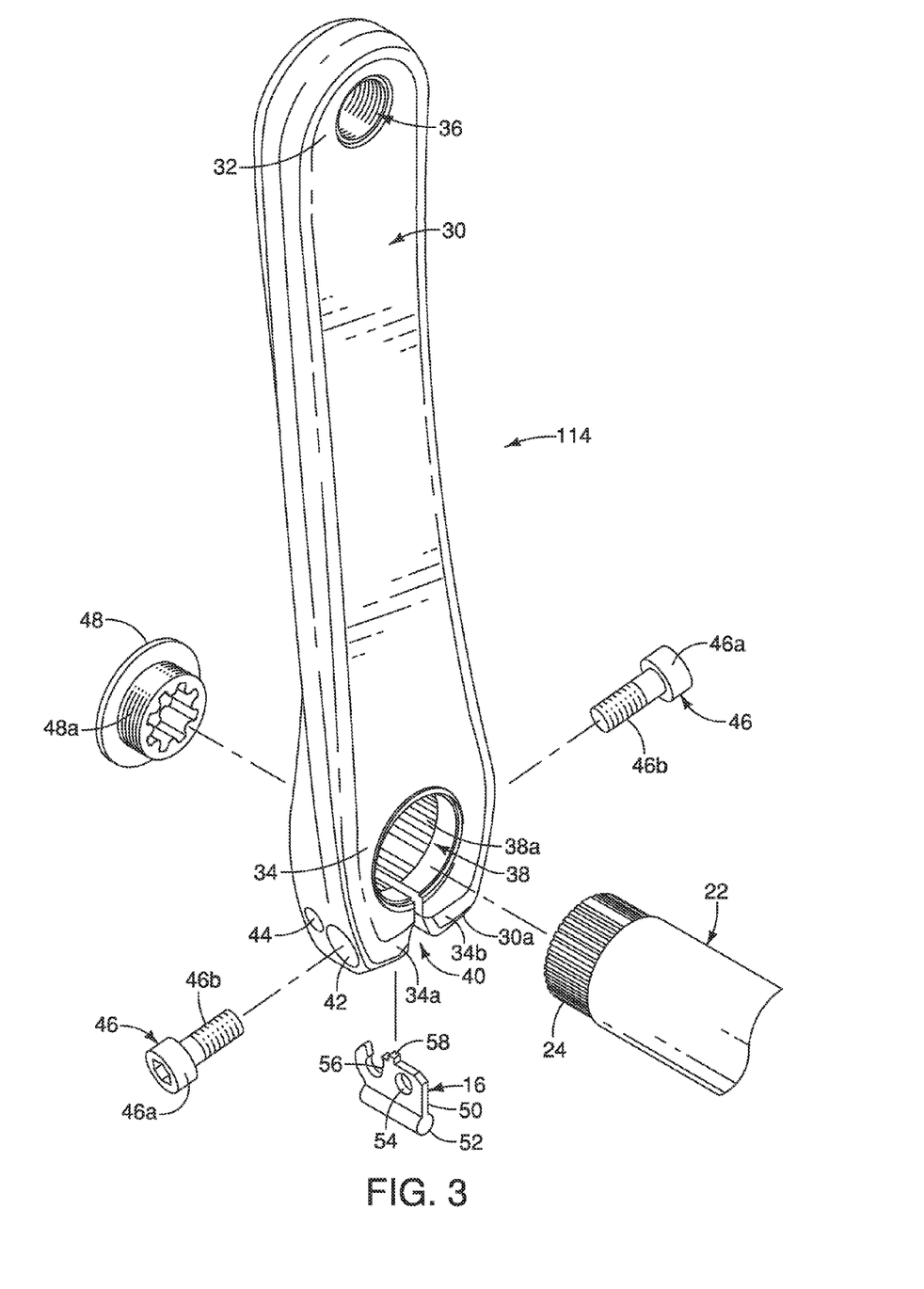
FIG. 3 is an exploded perspective view of the bicycle crank arm assembly illustrated in FIG. 1 and a portion of the crank axle of the bicycle.

As seen in FIG. 3, the bicycle crank arm assembly 14 is configured to be fixedly attached to one end 24 of the crank axle 22. In the illustrated embodiment, the bicycle crank arm assembly 14 is attached to the left end 24 of the crank axle 22. The left end 24 of the crank axle 22 also has a threaded bore 26 and a plurality of splines 28. However, it will be apparent to those skilled in the art from this disclosure that the bicycle crank arm assembly 14 could be configured to be attached to the right end of the crank axle 22, if needed and/or desired. In the illustrated embodiment, in addition to the crank detachable holder 16, the bicycle crank arm assembly 14 further includes a crank arm 30.

As seen in FIG. 3, the crank arm 30 has a pedal attachment end 32 and a crank axle attachment end 34. The crank arm 30 is both formed of a suitable rigid material such as a stainless steel, an aluminum alloy, a magnesium alloy, a titanium alloy, a fiber-reinforced resin, a combination non-metallic and metallic materials, etc. The pedal attachment end 32 defines a threaded bore 36 for attaching a pedal (not shown) in a conventional manner. The crank axle attachment end 34 defines a crank axle receiving opening 38 for receiving the end 24 of the crank axle 22. The crank axle attachment end 34 also defines a slot or slit 40, a first fastener bore 42 and a second fastener bore 44. The crank arm 30 also includes a pair of crank arm clamping bolts 46 (e.g., clamp bolts fasteners) for attached the crank arm 30 to the end 24 of the crank axle 22 in a releasable and reinstallable manner as discussed below. Each of the crank arm clamping bolts 46 has a head portion 46*a* and a threaded shaft portion 46*b*. Preferably, the crank arm 30 is also secured to the end 24 of the crank axle 22 by a crank arm fixing bolt 48 having a threaded shaft portion 48*a* that is threaded into the threaded bore 26 of the crank axle 22.

In the illustrated embodiment, the crank axle receiving opening 38 is a splined bore having a plurality of longitudinally extending splines 38*a* that mate with longitudinally extending splines 28 of the end 24 of the crank axle 22. Thus, the crank arm 30 non-rotatably attached on the end 24 of the crank axle 22. The slit 40 extends from a peripheral surface 30*a* of the crank arm 30 to the crank axle receiving opening 38 such that the crank axle attachment end 34 is divided into a first part 34*a* and a second part 34*b*. Preferably, the slit 40 is a radial slit that extends radially with respect to the center axis of the crank axle receiving opening 38. The fastener bores 42 and 44 extend transversely through the slit 40 for receiving one of the crank arm clamping bolts 46 to adjust the crank axle receiving opening 38 in size. These crank arm clamping bolts 46 are, for example, hexagon socket head bolts, and their heads 46*a* are preferably inserted from different directions with respect to the slit 40 as explained below. The crank arm 30 is clamped onto the end 24 of the crank axle 22 by tightening the crank arm clamping bolts 46 to squeeze the first and second parts 38*a* and 38*b* together and reducing the transverse width of the slit 40. In other words, the transverse width of the slit 40 is narrowed by tightening the crank arm clamping bolts 46 that extend across the slit 40 to clamp onto the crank arm 30 on the crank axle 22. With this arrangement, the crank arm 30 is strongly clamped onto the end 24 of the crank axle 22 by tightening up the two crank arm clamping bolts 46.

As seen in FIG. 3, the crank detachable holder 16 includes a crank arm attachment part 50 and a holding part 52. The holding part 52 is fixedly connected to the crank arm attachment part 50. In the first illustrated embodiment, the crank arm attachment part 50 and the holding part 52 are integrally formed as a one-piece, unitary member, which includes a magnetized material. For example, the crank arm attachment part 50 and the holding part 52 can be a one-piece magnetized metal such that the entire crank detachable holder 16 constitutes a magnet. Alternatively, the crank arm attachment part 50 and the holding part 52 can be a one-piece, hard resin material with embedded magnetized particles. Thus, in the first illustrated embodiment, the crank detachable holder 16 constitutes a crank arm magnet member that is sensed by the cadence sensor unit 12.

In the first illustrated embodiment, the crank arm attachment part 50 is a plate-shaped member that includes a first mounting opening 54. The first mounting opening 54 is dimensioned to receive one of the crank arm clamping bolts 46 that is also used to connect the crank arm 30 to the crank axle 22. Thus, the crank arm clamping bolt 46 is received in the first mounting opening 54 to attach the crank detachable holder 16 to the crank arm 30. In the first illustrated embodiment, the crank arm attachment part 50 further includes a second mounting opening 56. The second mounting opening 56 is in the form of a locking notch that is dimensioned to receive the other one of the crank arm clamping bolts 46 therethrough. In the first illustrated embodiment, the crank arm attachment part 50 further includes an axle engaging projection 58 to form a stopper plate. Thus, the axle engaging projection 58 is configured to engage a retaining hole (not shown) in the crank axle 22. The crank arm attachment part 50 prevents the crank arm 30 from drop off from the crank axle 22 even if the crank arm clamping bolts 46 become loose and the crank arm fixing bolt 48 has fallen off.

The holding part 52 is disposed on the opposite side of the plate of the crank arm attachment part 50 from the axle engaging projection 58. In this way, the holding part 52 projects from the crank arm 30. While the holding part 52 in FIG. 3 is illustrated as being a unitary part of the crank arm attachment part 50, the holding part 52 can be a separate piece that is connected to the crank arm attachment part 50 and/or the holding part 52 can include an electrical member. Thus, the holding part 52 is not limited to including magnetized member. Rather, the holding part 52 preferably includes one of a magnetized member or an electrical member as discussed below.

Figure 4:
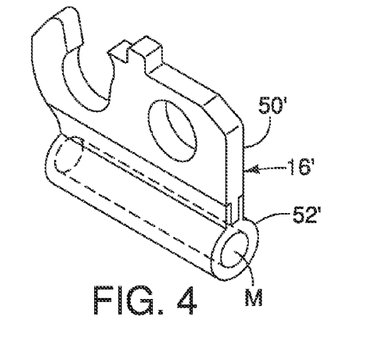
FIG. 4 is a perspective view of an alternate crank detachable holder for use with the bicycle crank arm illustrated in FIG. 1.
Figure 5:
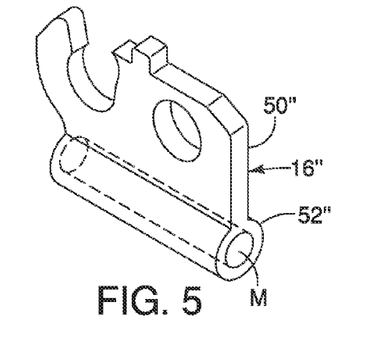
FIG. 5 is a perspective view of another alternate crank detachable holder for use with the bicycle crank arm illustrated in FIG. 1.
Figure 6:
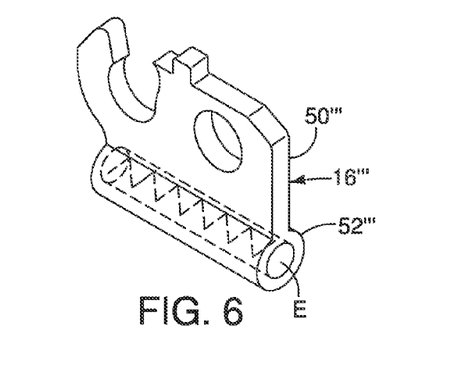
FIG. 6 is a perspective view of a still another alternate crank detachable holder for use with the bicycle crank arm illustrated in FIG. 1.

Some alternative examples of the holding part 52 is illustrated in FIGS. 4 to 6. For example, as seen in FIG. 4, a crank detachable holder 16 includes a crank arm attachment part 50' and the holding part 52'. Here, the crank arm attachment part 50' is formed of metal material and the holding part 52' is formed of resin material that is bonded to the crank arm attachment part 50'. The holding part 52 has at least one magnet M embedded in resin that forms the holding part 52. Another example of a crank detachable holder 16" is illustrated in FIG. 5, which shows a crank arm attachment part 50" and a holding part 52" both formed of a hard rigid material (metal or non-metallic) that is not magnetized. Rather, in the crank detachable holder 16" of FIG. 5, the magnet M is installed in a cavity of the holding part 52". Yet another example of a crank detachable holder 16''' is illustrated in FIG. 6, which shows a crank arm attachment part 50''' and a holding part 52''' both formed of a hard rigid material (metal or non-metallic) that is not magnetized. Rather, in the crank detachable holder 16''' of FIG. 5, an electrical member E is installed in a cavity of the holding part 52'''. The electrical member E can be, for example, at least one of a battery, a transmitter and a wireless communication device.

Figure 7:
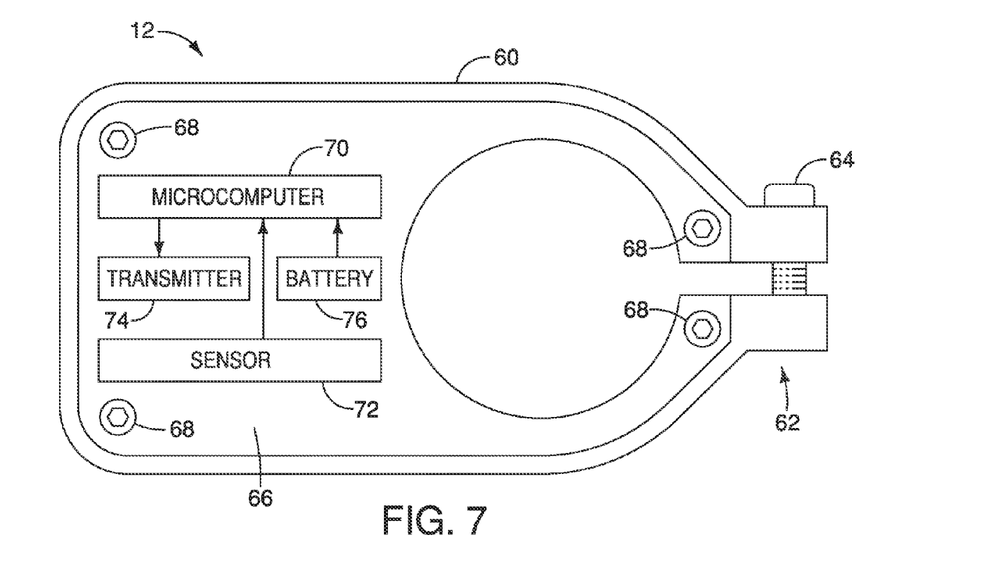
FIG. 7 is a schematic view of the cadence sensor unit illustrated in FIG. 1.
Figure 8:
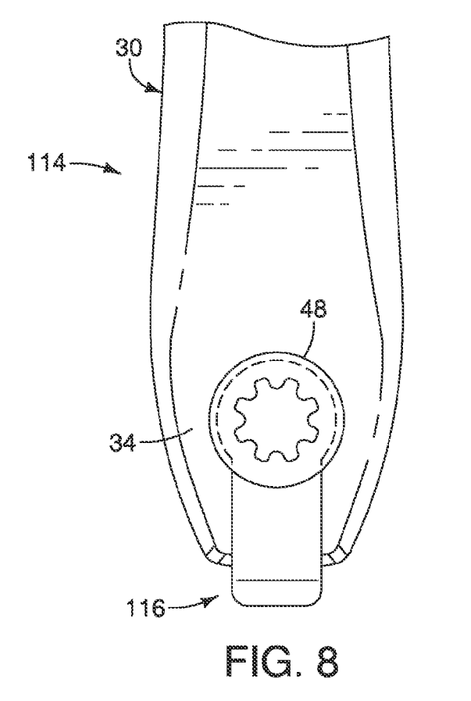
FIG. 8 is an outside elevational view of a portion of the crank arm illustrated in FIG. 1, but having a crank detachable holder in accordance with a second embodiment.
Figure 9:
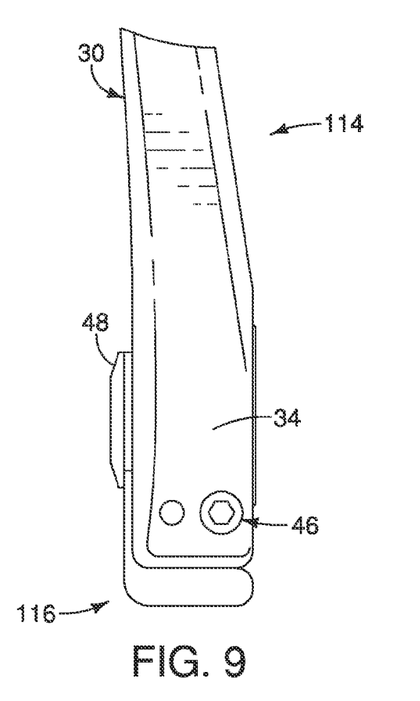
FIG. 9 is a side elevational view of the portion of the crank arm and the crank detachable holder illustrated in FIG. 8.
Figure 10:
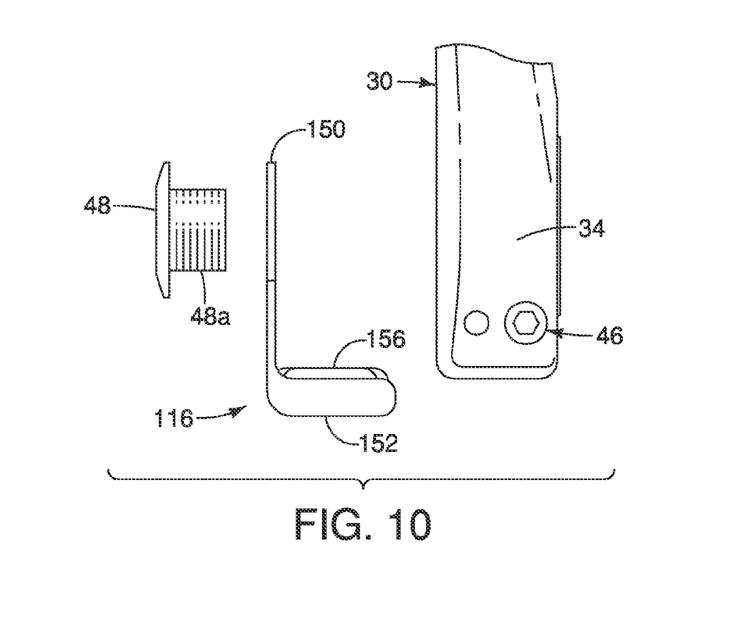
FIG. 10 is an exploded side elevational view of the portion of the crank arm and the crank detachable holder illustrated in FIGS. 8 and 9.
Figure 11:
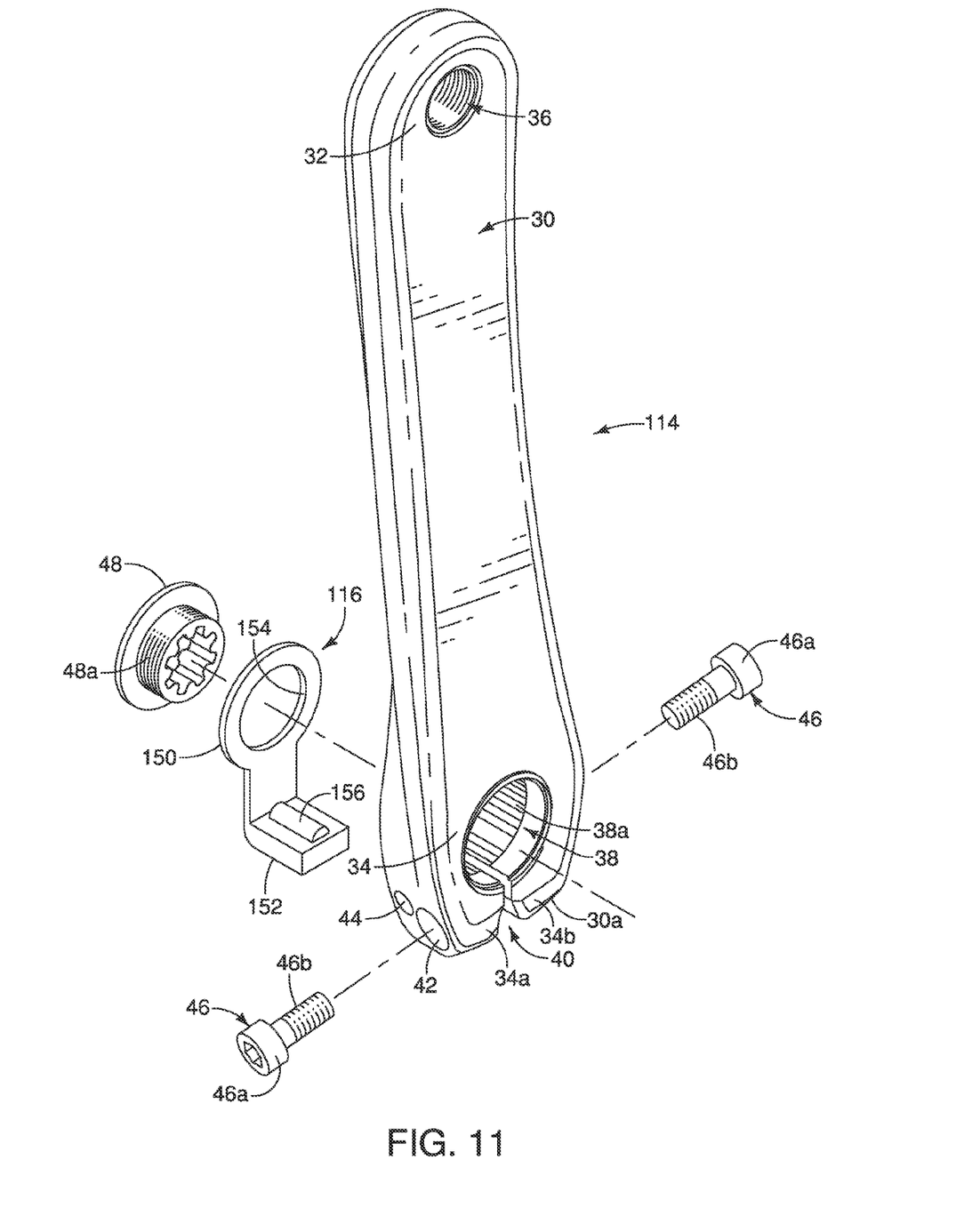
FIG. 11 is an exploded perspective view of the bicycle crank arm and the crank detachable holder illustrated in FIGS. 8 to 10.
Figure 12:
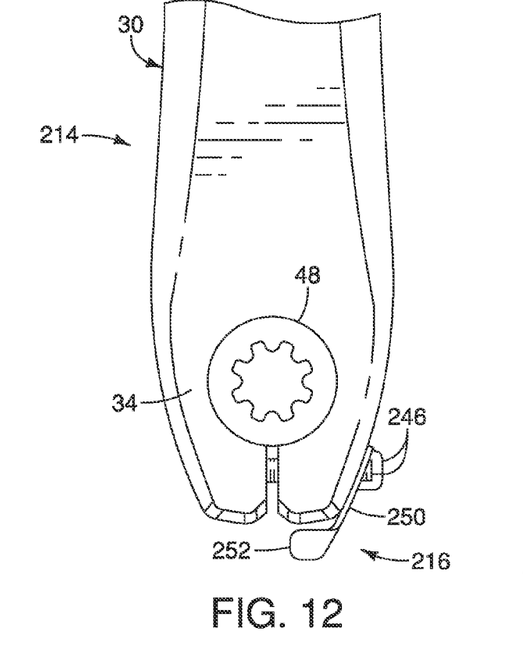
FIG. 12 is an outside elevational view of a portion of the crank arm illustrated in FIG. 1, but having a crank detachable holder in accordance with a third embodiment.
Figure 13:
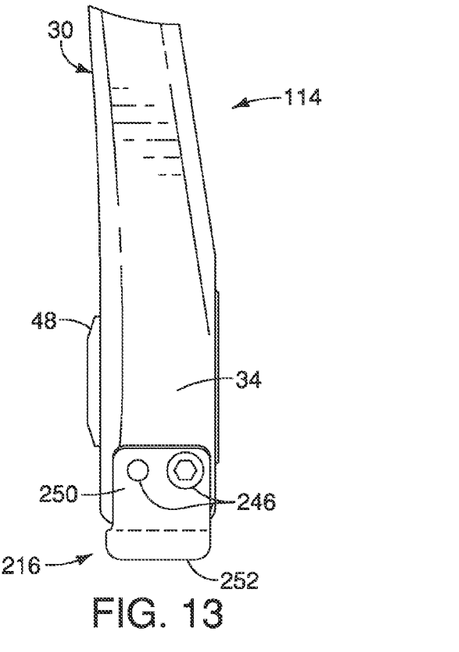
FIG. 13 is a side elevational view of the portion of the crank arm and the crank detachable holder illustrated in FIG. 12.
Figure 14:
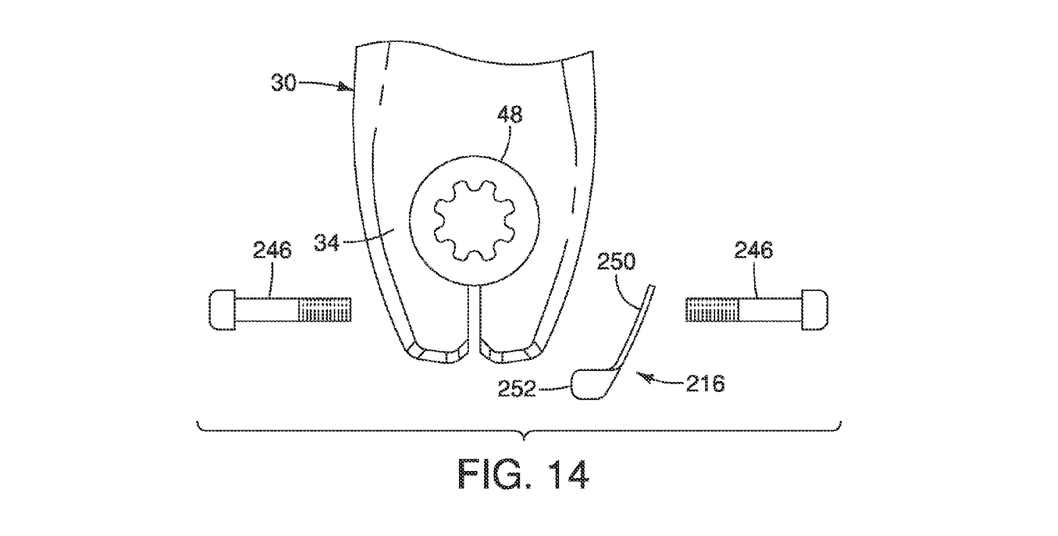
FIG. 14 is an exploded side elevational view of the portion of the crank arm and the crank detachable holder illustrated in FIGS. 12 and 13.
Figure 15:
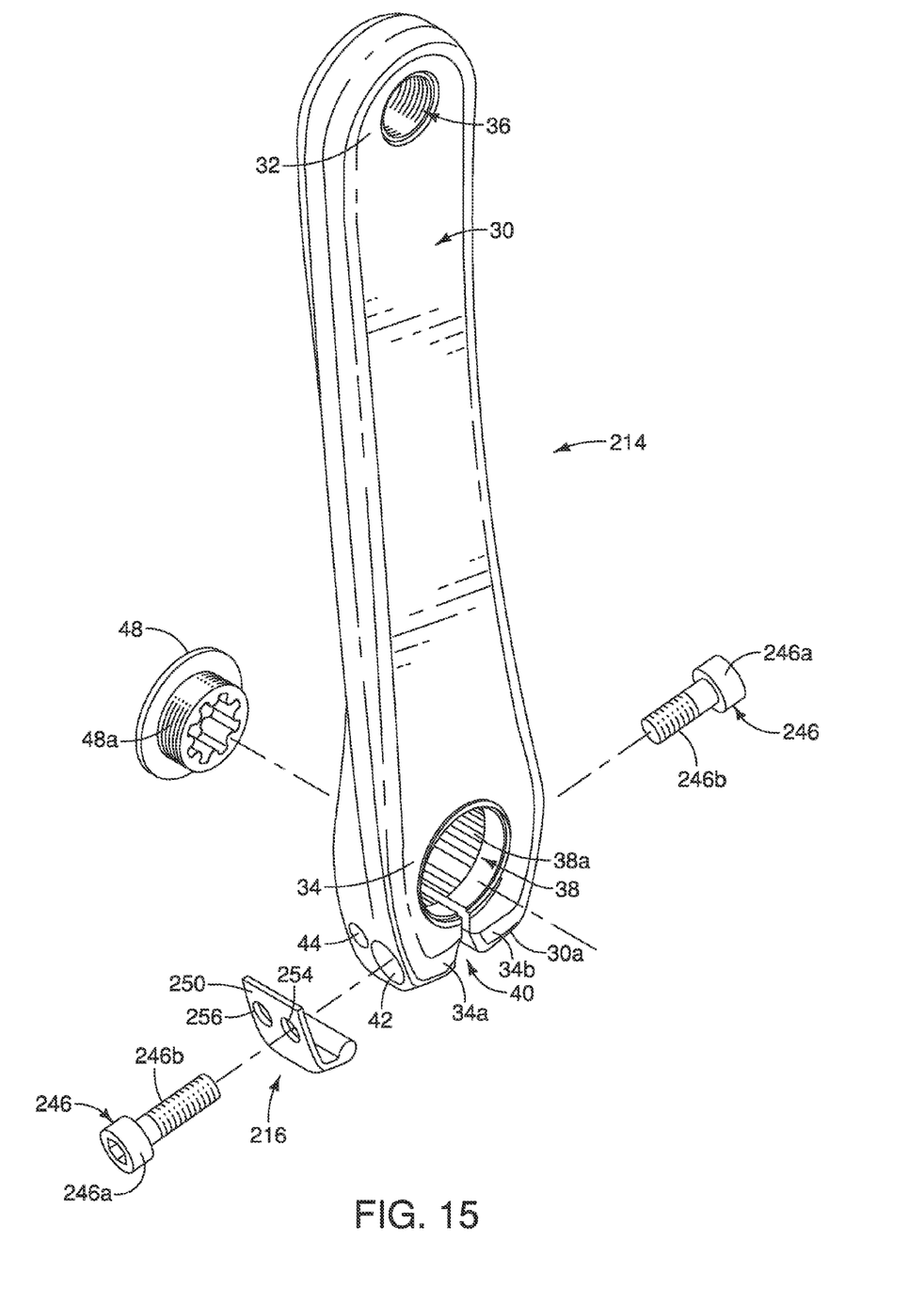
FIG. 15 is an exploded perspective view of the bicycle crank arm and the crank detachable holder illustrated in FIGS. 12 to 14.

Referring now to FIG. 7, the cadence sensor unit 12 will now be discussed. The cadence sensor unit 12 has a housing 60 with a clamping portion 62 that is clamped to the crank axle 22 by tightening the clamping bolt 64. Alternatively, the housing 60 is directly fixed on the hanger tube 18 or an outer surface of the bottom bracket bearing assembly 20 by a bolt. The housing has a cover 66 for concealing the components of the cadence sensor unit 12. The cover 66 is removably attached to the housing by a plurality of fasteners 66. Inside of the housing 60 is a microcomputer 70, a sensor 72, a transmitter 74 and a battery 76.

Preferably, the sensor 72 includes one of a reed switch or Hall Effect element that can detect the magnet field produced by the holding part 52 as the holding part 52 passing in the vicinity the sensor 72. Of course, it will be apparent from this disclosure that the sensor 72 can be other types of sensors if the holding part 52 includes an electrical member such as shown in FIG. 6.

The transmitter 74 is preferably a wireless transmitter that wirelessly transmits information to the cycling computer and or one or more electrical bicycle components. In other words, the transmitter 76 wirelessly transmits sensor signals of the sensor 72 and/or calculated data by the microcomputer 70.

The battery 76 constitutes a power storage device that may comprise a secondary storage battery such as a nickel cadmium battery, lithium ion battery, nickel hydride battery. Alternatively, the battery 76 can be replaced with a capacitor or other equivalent power storage device.

Referring now to FIGS. 8 to 11, a bicycle crank arm assembly 114 in accordance with a second embodiment will now be explained. Basically, the bicycle crank arm assembly 114 includes the crank arm 30 of the first embodiment and a crank detachable holder 116. Thus, similar to the first embodiment, the crank detachable holder 116 is sensed by the cadence sensor unit 12 in the same way as the crank detachable holder 16, discussed above. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second illustrated embodiment, the crank detachable holder 116 includes a crank arm attachment part 150 and a holding part 152. The holding part 152 is fixedly connected to the crank arm attachment part 150. In the second illustrated embodiment, the crank arm attachment part 150 and the holding part 152 are integrally formed as a one-piece, unitary member, which includes a magnetized material. For example, the crank arm attachment part 150 and the holding part 152 can be a one-piece magnetized metal such that the entire crank detachable holder 116 constitutes a magnet. Alternatively, the crank arm attachment part 150 and the holding part 152 can be a one-piece, hard resin material with embedded magnetized particles. Thus, in the second illustrated embodiment, the crank detachable holder 116 constitutes a crank arm magnet member that is sensed by the cadence sensor unit 12. However, just as in the first embodiment, the holding part 152 is not limited to including magnetized member, but rather, the holding part 152 can be configured to include one of a magnetized member or an electrical member similar to FIGS. 4 to 6.

In the second illustrated embodiment, the crank arm attachment part 150 is a plate-shaped member that includes a mounting opening 154. The mounting opening 154 is dimensioned to receive the threaded shaft portion 48a of the crank arm fixing bolt 48. Thus, the threaded shaft portion 48a of the crank arm fixing bolt 48 is received in the mounting opening 1154 to attach the crank detachable holder 116 to the crank arm 30. In this way, the crank arm fixing bolt 48 is used to connect both the crank detachable holder 116 to the crank arm 30 and the crank arm 30 to the crank axle 22.

In the second illustrated embodiment, the holding part 152 extends perpendicularly from the crank arm attachment part 150. The holding part 152 includes an anti-movement projection 156 configured to engage the crank arm 30 by projecting into the slit 40 of the crank arm 30. Thus, rotation of the crank detachable holder 116 on the threaded shaft portion 48a is prevented once the crank detachable holder 116 is secured to the crank arm 30.

Referring now to FIGS. 12 to 15, a bicycle crank arm assembly 214 in accordance with a third embodiment will now be explained. Basically, the bicycle crank arm assembly 214 includes the crank arm 30 of the first embodiment and a crank detachable holder 216. However, in this third embodiment, the crank arm clamping bolts 46 have been replaced with longer the crank arm clamping bolts 246. Similar to the first embodiment, the crank detachable holder 216 is sensed by the cadence sensor unit 12 in the same way as the crank detachable holder 16, discussed above. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the second illustrated embodiment, the crank detachable holder 216 includes a crank arm attachment part 250 and a holding part 252. The holding part 252 is fixedly connected to the crank arm attachment part 250. In the third illustrated embodiment, the crank arm attachment part 250 and the holding part 252 are integrally formed as a one-piece, unitary member, which includes a magnetized material. For example, the crank arm attachment part 250 and the holding part 252 can be a one-piece magnetized metal such that the entire crank detachable holder 216 constitutes a magnet. Alternatively, the crank arm attachment part 250 and the holding part 252 can be a one-piece, hard resin material with embedded magnetized particles. Thus, in the third illustrated embodiment, the crank detachable holder 216 constitutes a crank arm magnet member that is sensed by the cadence sensor unit 12. However, just as in the first embodiment, the holding part 252 is not limited to including magnetized member, but rather, the holding part 252 can be configured to include one of a magnetized member or an electrical member similar to FIGS. 4 to 6.

In the third illustrated embodiment, the crank arm attachment part 250 is a plate-shaped member that includes a first mounting opening 254 and a second mounting opening 256, and that has the holding part 252 (e.g., the magnetized part) disposed at one end of the plate. The first mounting opening 254 of the crank arm attachment part 250 is dimensioned to receive one of the crank arm clamping bolt 246, while the second mounting opening 256 for receiving a second crank arm clamping bolts 246. In particular, the head portions 246a of the crank arm clamping bolts 246 are larger than the diameter of the first and second mounting openings 254 and 256 so that the head portions 246a do not pass through the first and second mounting openings 254 and 256. The first and second mounting openings 254 and 256 are each dimensioned to receive the threaded shaft portion 246b of one of the crank arm clamping bolts 246. The crank arm clamping bolts 246 are installed in opposite directions to the crank arm 30 such that one of the crank arm clamping bolts 246 is received in the first mounting opening 254 to attach the crank detachable holder 216 to the crank arm 30, and the other of the crank arm clamping bolts 246 is received in the second mounting opening 256 to prevent rotation of the crank detachable holder 216 relative to the crank arm 30. Optionally, a nut (not shown) can be installed on the threaded shaft portion 246b of the other of the crank arm clamping bolts 246 if the threaded shaft portion 246b projects a sufficient distance out of the second mounting opening 256. In this way, crank arm clamping bolts 246 are used to connect both the crank detachable holder 216 to the crank arm 30 and the crank arm 30 to the crank axle 22.

In understanding the scope of the present invention, the term "comprising" and its derivatives, as used herein, are intended to be open ended terms that specify the presence of the stated features, elements, components, groups, integers, and/or steps, hut do not exclude the presence of other unstated features, elements, components, groups, integers and/or steps. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The foregoing also applies to words having similar meanings such as the terms, "including", "having" and their derivatives. Also, the terms "part," "section," "portion," "member" or "element" when used in the singular can have the dual meaning of a single part or a plurality of parts. The terms "connect" and "connected", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e. one element is unitary part of the other element. For example, the holding part 52 can be directly secured to the crank arm attachment part 50, or can be indirectly secured to the crank arm attachment part 50 through intermediate member(s), or can be integral with the crank arm attachment part 50 as illustrated. This definition of the terms "connect" and "connected" also applies to words of similar meaning, for example, the terms "attach", "attached", "join", "joined", "fix", "fixed", "bond", "bonded" and their derivatives terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A crank detachable holder comprising:
   a flat plate-shaped member that defines a crank arm attachment part having a mounting opening dimensioned to receive a bolt for connecting the crank arm to a crank axle, the flat plate-shaped member having a straight edge; and
   a holding part including a magnetized member, and being connected to the straight edge of the plate-shaped member that defines the crank arm attachment part, the holding part extending along the straight edge.

2. The crank detachable holder according to claim 1, wherein
   the holding part includes an electrical member.

3. The crank detachable holder according to claim 1, wherein
   the mounting opening of the crank arm attachment part is dimensioned to receive one of a crank arm fixing bolt and a first crank arm clamping bolt.

4. The crank detachable holder according to claim 1, wherein
   the mounting opening of the crank arm attachment part is dimensioned to receive a first crank arm clamping bolt.

5. The crank detachable holder according to claim 4, wherein
   the crank arm attachment part further includes a second mounting opening.

6. The crank detachable holder according to claim 5, wherein
   the crank arm attachment part is a plate having the magnetized part disposed at one end of the plate.

7. The crank detachable holder according to claim 4, wherein
   the flat plate-shaped member further includes an axle engaging projection to form a stopper plate.

8. The crank detachable holder according to claim 7, wherein
   the axle engaging projection being disposed on a side of the flat plate-shaped member opposite the straight edge.

9. The crank detachable holder according to claim 1, wherein
   the crank arm attachment part and the holding part are integrally formed as a one-piece member.

10. The crank detachable holder according to claim 1, wherein
    the magnetized member is at least one magnet embedded in resin.

11. The crank detachable holder according to claim 10, wherein
    the holding part includes an anti-movement projection configured to engage a crank arm.

12. A crank detachable holder comprising:
    a flat plate-shaped member defining a crank arm attachment part and having a mounting opening dimensioned to receive a first crank arm clamping bolt and a second mounting opening dimensioned to receive a second crank arm clamping bolt, the first and second crank arm clamping bolts for connecting the crank arm and the crank arm attachment part to a crank axle, the flat plate-shaped member having a straight edge; and a holding part including a magnetized member and is connected to the straight edge of the flat plate-shaped member.

13. A bicycle crank arm assembly comprising:

a crank arm having a pedal attachment end and a crank axle attachment end, the crank axle attachment end defining a crank axle receiving opening and a clamping bore that extends in a direction transverse to the direction of the crank axle receiving opening; and a crank detachable holder including a crank arm attachment part and a holding part that is connected to the crank arm attachment part, the crank arm attachment part having a mounting opening, the holding part including a magnetized member, and a crank arm clamping bolt extending through the clamping bore and through the mounting opening, the clamping bolt being movable between a release orientation freeing the crank arm attachment part and the crank arm, and a clamping orientation in which the clamping bolt clamps the crank arm to a crank axle and holds the crank arm attachment part to the crank axle attachment end of the crank arm.

14. The bicycle crank arm assembly according to claim 13, wherein the crank arm attachment part includes a second mounting opening dimensioned to receive a second crank arm clamping bolt.

15. The bicycle crank arm assembly according to claim 13, wherein the holding part includes an electrical member.

16. The bicycle crank arm assembly according to claim 13, wherein the crank arm attachment part includes a second clamping opening dimensioned to receive a second crank arm clamping bolt.

17. The bicycle crank arm assembly according to claim 16, wherein the second mounting opening extends parallel to the mounting opening.

* * * * *